US 6,535,330 B1

(12) United States Patent
Lelic et al.

(10) Patent No.: US 6,535,330 B1
(45) Date of Patent: Mar. 18, 2003

(54) DYNAMIC CONTROLLER FOR A MULTI-CHANNEL OPTICAL AMPLIFIER

(75) Inventors: Muhidin Lelic, Horseheads, NY (US); Gregory J. Cowle, Santa Clara, CA (US); Naresh Menon, Corning, NY (US)

(73) Assignee: Corning Incorporated, Corning, NY (US)

( * ) Notice: Subject to any disclaimer, the term of this patent is extended or adjusted under 35 U.S.C. 154(b) by 46 days.

(21) Appl. No.: 09/823,504

(22) Filed: Mar. 31, 2001

(51) Int. Cl.$^7$ ................................................. H01S 3/00
(52) U.S. Cl. ............................ 359/337.13; 359/337.1; 359/337; 359/341.41
(58) Field of Search ....................... 359/337.1, 337.11, 359/337.13, 337, 341.41

(56) References Cited

U.S. PATENT DOCUMENTS

| | | | |
|---|---|---|---|
| 5,557,442 A | * | 9/1996 | Huber ........................ 359/179 |
| 6,108,123 A | | 8/2000 | Kinoshita |
| 6,111,686 A | | 8/2000 | Toyohara |
| 6,111,688 A | | 8/2000 | Kobayashi et al. |
| 6,115,173 A | | 9/2000 | Tanaka et al. |
| 6,118,576 A | | 9/2000 | Sugiya et al. |
| 6,125,583 A | | 10/2000 | Murray et al. |
| 6,172,534 B1 | | 1/2001 | Brierley |
| 6,198,571 B1 | | 3/2001 | Yang |
| 6,201,636 B1 | | 3/2001 | Noda |
| 6,229,643 B1 | | 5/2001 | Nakamura |
| 6,233,091 B1 | | 5/2001 | Kosaka et al. |
| 6,246,514 B1 | | 6/2001 | Bonnedal et al. |
| 6,256,141 B1 | | 7/2001 | Kosaka |
| 6,259,553 B1 | | 7/2001 | Kinoshita |
| 6,266,466 B1 | | 7/2001 | Nabeyama et al. |
| 6,271,962 B1 | | 8/2001 | Choi |
| 6,275,330 B1 | | 8/2001 | Izumi |
| 6,275,331 B1 | | 8/2001 | Jones et al. |
| 6,282,017 B1 | | 8/2001 | Kinoshita |
| 6,288,836 B1 | | 9/2001 | Kawasaki et al. |

OTHER PUBLICATIONS

Yan Sun, et al., "Optical Fiber Amplifiers for WDM Optical," Bell Labs Technical Journal, pp. 187–206, Jan.–Mar., 1999.

Stephen R. Chinn, "Simplified Modeling of Transients in Gain–Clamped Erbium–Doped Fiber Amplifiers," pp. 1095–1110, Journal of Lightwave Technology, vol. 16, No. 6, Jun., 1998.

A. A. M. Saleh et al., "Modeling of Gain in Erbium–Doped Fiber Amplifiers," pp. 714–717, IEEE Photonics Technology Letters, vol. 2, No. 10, Oct. 1990.

E. Desurvire, "Analysis of Transient Gain Saturation and Recovery in Erbium–Doped Fiber Amplifiers," pp. 196–199, IEEE Photonics Technology Letters, vol. 1, No. 8, Aug. 1989.

(List continued on next page.)

*Primary Examiner*—Mark Hellner
(74) *Attorney, Agent, or Firm*—Svetlana Z. Short; Thomas W. Cole

(57) ABSTRACT

A dynamic controller for a multi-channel EDFA-type optical amplifier is provided that is capable of providing a substantially tilt-free output over a range of selectable gain set points. The dynamic controller includes a variable optical attenuator coupled between the two amplification coils of the EDFA amplifier, and a control circuit that instructs the attenuator of an amount that each channel should be attenuated to achieve a tilt-free output at a selected gain point. The controller further includes a gain controller and a tilt controller connected to the control circuit of the variable optical attenuator for providing signals indicative of an average amount of per channel attenuation and a relative amount of per channel attenuation necessary to achieve a selected gain set point while reducing or eliminating tilt, respectively.

26 Claims, 4 Drawing Sheets

OTHER PUBLICATIONS

H. Suzuki et al., "Power Excursion Suppression in Cascades of Optical Amplifiers with Automatic Maximum Level Control," pp. 1051–1053, IEEE Photonics Technology Letters, vol. 11, No. 8, Aug., 1999.

Naoki, Suzuki, et al., "Optical Fiber Amplifiers Employing Novel High–Speed AGC and Tone–Signal ALC Functions for WDM Transmission Systems," Information Technology R & D Center, Mitsubishi Electric Corporation.

Yuxing Zhao, et al., "Gain Clamped Erbium–Doped Fiber Amplifiers—Modeling and Experiment," pp. 1008–1012, IEEE Journal of Selected Topics in Quantum Electronics, vol. 3, No. 4, Aug. 1997.

Y. Sun, et al., "Average Inversion Level, Modeling, and Physics of Erbium–Doped Fiber Amplifiers," pp. 991–1007, IEEE Journal of Selected Topics in Quantum Electronics, vol. 3, No. 4, Aug., 1997.

A. Yu, et al., "Design and Modeling of Laser–Controlled Erbium–Doped Fiber Amplifiers," pp. 1013–1018, IEEE Journal of Selected Topics in Quantum ElectronicEs, vol. 3, No. 4, Aug., 1997.

L. Tancevski, et al., "Gain Control in EDFA's by Pump Compensation," IEEE Photonics Technology Letters, pp. 1313–1315, vol. 10, No. 9, Sep., 1998.

H. Suzuki, et al., "Dynamic Gain Control by Maximum Signal Power Channel in Optical Linear Repeaters for WDM Photonics Transport Networks," IEEE Photonics Technology Letters, pp. 734–736, vol. 10, No. 5, May 1998.

A. K. Srivastava, et al., "Fast–Link Control Protection of Surviving Channels in Multiwavelength Optical Networks," IEEE Photonics Technology Letters, pp. 1667–1669, vol. 9, No. 12, Dec., 1997.

Motoshima et al., "Dynamic compensation of transient gain saturation in erbium–doped fiber amplifiers by pump feedback control," Technical Digest OFC'93, 40–42 (1993).

Srivastava et al., Fast control in erbium–doped fiber amplifier, Technical Digest OAA '96, 24–27 (1996).

Karasek et al., "Analysis of Dynamic Pump–Loss Controlled Gain–Locking System for Erbium–Doped fiber amplifiers," IEEE Photonics Technical Letters, 10, 1171–1173 (1998).

Yoon et al., "Reference level free multichannel gain equalization and transient gain suppression of EDFA with differential ASE power monitoring," IEEE Photonics Technology Letter, vol. 11, No. 3, Mar. 1999, pp. 316–318.

Okamura, "Automatic optical loss compensation with erbium–doped fiber amplifier," Journal Of Lightwave Technology, 16 (5), (1995).

Richards et al., "A theoretical investigation of dynamic all–optical automatic gain control in multichannel EDFAs and EDFA cascades," IEEE J. Topics in Quantum in Quantum Electronics, 3 (4) (1997).

Park et al., "Dynamic gain and output control in gain–flattened EDFA," IEEE Prot. Tech. Letters, 10 (6), 1998, pp. 787–789.

Takahashi et al., "An output power stabilized erbium doped fiber amplifier with automatic gain control," IEEE J. Selected Topics in Quantum Electronics, 3 (4) (1997).

Landousies et al., "Low–power transient in multichannel equalised and stabilised gain amplifier using passive gain control," Electronics Letters, Sep. 26, 1996, vol. 32, No. 20.

Yadlowsky, "Independent Control of EDFA Gain Shape and Magnitude Using Excited–State Trapping", IEEE Photonics Technology Letters, vol. 11, No. 5, May 1999, pp. 539–541.

Desurvive et al., "Dynamic Gain Compensation in Saturated Erbium–Doped Fiber Amplifiers", IEEE Photonics Technology Letters, vol. 3, No. 5, May 1991, pp. 453–455.

Desurvive, "Erbium Doped Fiber Amplifiers—Principles and Applications," John Wiley & Sons, Inc. (1994), see Chapter 6, sections 3–4 (pp. 469–487).

Giles et al., "Modeling Erbium–Doped Fiber Amplifiers", Journal of Lightwave Technology, vol. 9, No. 2, Feb. 1991, pp. 271–283.

* cited by examiner

DYNAMIC CONTROLLER FOR A MULTI-CHANNEL OPTICAL AMPLIFIER

FIELD OF THE INVENTION

This invention generally relates to control systems for optical amplifiers and is specifically concerned with a dynamic gain and tilt controller for an erbium-doped fiber amplifier that monitors amplified spontaneous emission at different points in the amplifier output spectrum to minimize tilt in the output.

BACKGROUND OF THE INVENTION

Erbium-doped fiber amplifiers (EDFAs) are used in optical transmission networks to extend transmission distances and to compensate for losses from various network elements. Such amplifiers typically comprise a pump laser whose output is optically coupled to the input of two or more serially connected coils of erbium-doped optical fiber. In operation, the output of the pump laser excites the atoms of erbium dopant within the serially connected coils of doped fiber. These excited atoms release their excess energy in proportion to the strength of the incoming optical signal, which results in a modulated, amplified output.

While such EDFAs work well for their intended purpose, problems arise when such amplifiers are used to amplify with multi-channel optical signals. Because of mismatches between the differing wavelengths of such multi-channel signals, and the population of dopant atoms at various excitation states, such amplifiers tend to amplify certain channels more than others, resulting in a non-flat gain across the spectrum of optical channels. Such non-uniformities in output amplification across a spectrum of channels is known as tilt. If the tilt in the output is not corrected, the noise, or amplified spontaneous emission (ASE) carried by the least-amplified channels can accumulate over distance to a point where the signal to noise ratio becomes small enough to effectively obliterate the channel.

The prior art has attempted to solve the tilt problem by interposing a gain flattening filter between the two serially connected coils of erbium-doped optical fiber. Such a filter is pre-calibrated at a particular gain level to attenuate the most strongly amplified channels in order to flatten the distribution of amplification across the channel spectrum. Unfortunately, such a technique has proven to be only a partial solution as it does not remove all of the tilt associated with the amplifier output. Moreover, this technique is limited to a single, preselected gain level as the shape of the tilt varies with the gain of the amplifier. To further flatten the amplified output, it has also been proposed to modulate the power input to the pump laser in accordance with the relative amplitudes of ASE power taken from the end points of the output channel spectrum. Since the strength of an amplified channel is proportional to the strength of the ASE in the frequency neighborhood of that channel, the comparison of ASE strength at the end points of the channel spectrum yields a clear indication of the amount of tilt in the amplified output. The combination of a gain flattening filter with such laser power modulation effectively reduces more of the tilt associated with the output signal by changing the population distribution of the various excited states of the dopant in the amplifier coils. Unfortunately, such a technique is likewise effective at only a single gain set point level, which in turn limits its flexibility within an optical transmission system in situations where, for example, a constant output strength is desired while the strength of the signal to be amplified varies.

Accordingly, there is a need for a dynamic controller for a multi-channel optical amplifier that is capable of providing effective tilt control of the amplifier output over any one of a broad range of selectable gain level set points. Ideally, such a controller would be relatively simple in construction, and formed from inexpensive, commercially available optical and electrical components. Finally, such a system should be easily retrofittable onto existing EDFA amplifiers.

SUMMARY OF THE INVENTION

The controller of the invention overcomes the aforementioned shortcomings associated with the prior art by providing a dynamic controller for a multi-channel optical amplifier capable of providing tilt control over a broad gain range of selectable gain levels. To this end, the controller of the invention comprises a variable optical attenuator (VOA) coupled between the input and output of the amplifier, a control circuit connected to the variable optical attenuator for controlling the amount that each optical channel should be attenuated to attain a flat output over the channel spectrum, and a gain controller and a tilt controller connected to an input of the control circuit. The gain controller provides a signal indicative of an average amount of per channel attenuation necessary to achieve a selected gain set point. The tilt controller provides a signal indicative of relative amounts that different channels should be attenuated to reduce tilt.

The gain controller includes a ratio circuit connected to input and output signals of the amplifier for providing a signal indicative of actual amplifier gain, as well as a set point circuit connected to the ratio circuit for providing a signal indicative of any difference between the selected amplifier gain and actual amplifier gain. This difference signal is in turn relayed to the control circuit of the variable optical attenuator.

The tilt controller includes a noise circuit optically connected to the amplifier output for providing a signal indicative of relative strengths of ASE between different channels, as well as a pump laser control circuit for providing a signal indicative of a power level that said laser should be operated at to reduce tilt. The tilt controller further includes a VOA adjustment circuit connected to the output of the pump laser control circuit for providing a signal to the VOA control circuit indicative of relative amounts the different channels should be attenuated to reduce tilt. To further flatten the amplified signal output, the tilt controller may further comprise a dynamic gain flattening filter coupled between the variable optical attenuator and the downstream coil of erbium-doped fiber cable. The dynamic gain flattening filter may have an input connected to an output of the noise monitoring circuit in order to assist the VOA in flattening the amplifier output.

In operation, the system operator selects a set point via the set point circuit of the gain controller. The gain controller in turn instructs the variable optical attenuator controller of the amount each channel should be attenuated in order to achieve the selected gain. Simultaneously, the tilt controller monitors the amount of ASE across two selected points in the channel output spectrum, and proceeds to provide a signal to the control circuit of the variable optical attenuator indicative of relative amounts that different channels should be attenuated to reduce tilt. The control circuit combines the signals received from the gain controller and the tilt controller such that the variable optical attenuator provides a substantially tilt-free output at the selected gain level.

DETAILED DESCRIPTION OF THE INVENTION

Figure 1:
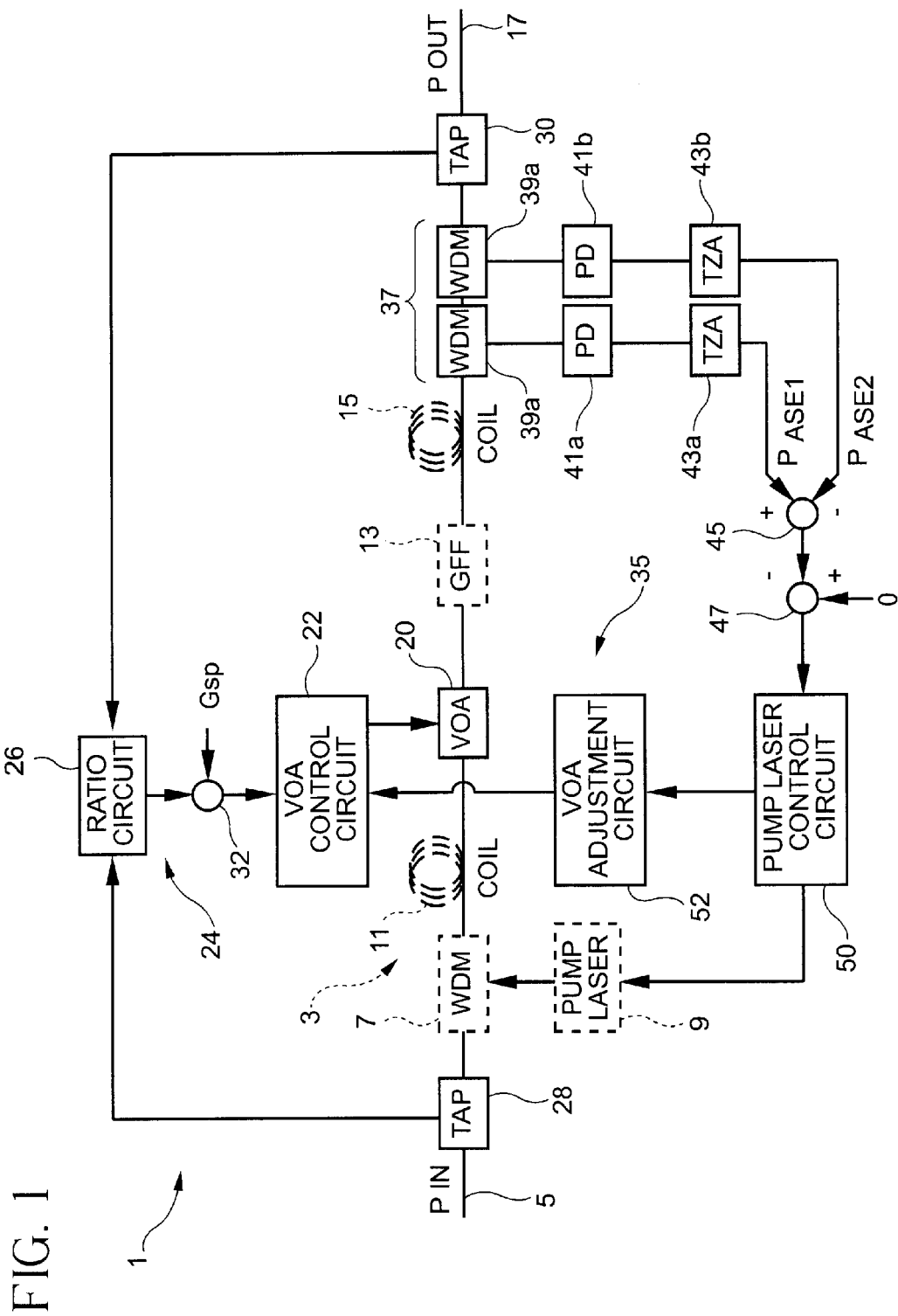
FIG. 1 is a schematic diagram of a first embodiment of the dynamic controller connected to an EDFA, wherein the amplifier components are indicated in phantom.

With reference to FIG. 1, wherein like reference numerals indicate like components throughout all of the several Figures, the dynamic controller 1 of the invention is particularly adapted for use with an EDFA-type optical amplifier 3 well known in the optical transmission arts. Such an amplifier 3 includes an optical input wave guide 5 for receiving an amplifier input (Pin). The input wave guide 5 is serially connected to a wavelength division multiplexer 7 for coupling the output of a pump laser 9 into the amplifier 3. While only one pump laser 9 is shown in FIG. 1, such amplifiers 3 often employ more than one pump laser, and it should be understood that the dynamic controller 1 is applicable to any optical amplifier regardless of the number of pump lasers used. The output of the wavelength division multiplexer 7 is connected to an upstream amplification coil 11 formed from a coiled length of erbium-doped optical fiber. The output of the upstream amplification coil 11 is in turn connected to a gain flattening filter 13 which is pre-calibrated at a particular gain level to reduce tilt in the output of the amplifier 3 by attenuating the strengths of the most amplified channels so that they are roughly equal to the strength of the least amplified channels. Finally, the EDFA amplifier includes a downstream amplification coil 15 which, like coil 11, is formed from a coiled length of erbium-doped optical fiber. The amplified output Pout of the EDFA 3 is transmitted through the optical output wave guide 17.

The dynamic controller 1 of the invention includes a variable optical attenuator (VOA) 20 preferably coupled between the upstream amplification coil 11 and gain flattening filter 13. Such optical attenuators are electronically controlled optical elements capable of attenuating each of the various channels within the amplifier input at any point along a fairly broad attenuation range. The optical attenuator 20 is connected to the output of a VOA control circuit 22 that provides the signals instructing the attenuator 20 the exact amount that each of the channels in the output is to be attenuated. In the preferred embodiment, the variable optical attenuator 20 and VOA control circuit are manufactured by Corning Incorporated, located in Corning, N.Y.

A gain controller 24 is connected to the VOA control circuit 22 for providing signals for instructing the VOA control circuit 22 as to an average amount that each of the channels is to be attenuated in order for the amplifier 3 to amplify the input Pin at a selected gain set point. The gain controller 24 includes a ratio circuit 26 connected to an input tap 28 and an output tap 30 for generating a signal indicative of the actual gain of the amplifier 3. Both the input and output taps 28, 30 convert a small percentage of the light energy into an electrical signal, and continuously conduct these signals to the ratio circuit 26, which in turn compares the strength of these signals in order to generate a signal indicative of a power ratio between Pin and Pout. The ratio circuit 26 is connected to a set point circuit 32 which compares the actual gain of the amplifier 3 indicated by the ratio of Pin and Pout with the gain level associated with a selected set point. The set point circuit 32 then generates a signal indicative of any difference between the actual and desired amplifier gain, and transmits this difference signal to the VOA control circuit 22. Circuit 22 converts this difference signal into a signal indicative of an average amount that each of the channels is to be attenuated in order to achieve the gain associated with the selected gain set point. In the preferred embodiment, the ratio circuit 26 and the set point circuit 32 are preferably manufactured by Corning Incorporated, although these components could be replaced by a microprocessor or digital signal processor.

A tilt controller 35 is also connected to an input of the VOA control circuit 22. Tilt controller 35 includes a noise monitoring circuit 37 which, in this particular embodiment, is formed by a pair of wavelength division multiplexers 39a,b serially connected downstream of the amplification coil 15. Each of the multiplexers 39a,b is tuned to receive different portions of the amplified output signal generated by the amplifier 3 at wavelengths which are in between the wavelengths associated with the data-carrying channels of the output. The monitoring of frequencies disposed between the amplifier output not only obviates the need for using and hence reducing the number of channels that can be used to transmit data, but also provides a clean base line for noise or amplified spontaneous emission (ASE) which is completely unmixed with a data-carrying signal. The two points on the output spectrum monitored by the multiplexers 39a,b are selected near the end points of the output spectrum to provide a maximum amount of information with respect to the amount of tilt which may be in the composite output signal.

The ASE-indicating light captured by the multiplexers 39a,b is relayed to photodiodes 41a,b which in turn convert this light into an electrical signal. These electrical signals are amplified by trans-impedance amplifiers 43a,b, respectively. The outputs of the trans-impedance amplifiers 43a,b are conducted to comparator circuit 35 which generates a signal indicative of the relative strengths between these signals (and hence the relative strength between the AFE noise or ASEs associated with the two selected points of the output spectrum). This signal is in turn transmitted to a tilt set point circuit 47, which generates a signal that indicates the degree to which the power level to the pump laser should be modified in order to minimize tilt. The signal from the tilt set point circuitry is in turn conducted to the pump laser control circuit 50, which modulates the power level that the pump laser 9 is to be operated in order to reduce tilt. The power modulation signal generated by the circuit 50 is also conducted to the last component of the tilt controller, which is a VOA adjustment circuit 52. The adjustment circuit 52 converts the power modulation signal received from the pump laser control circuit 50 into a signal indicative of the relative amounts that each of the channels in the amplifier output should be attenuated in order to eliminate tilt. This signal is in turn conducted to the VOA control circuit 22 as indicated.

The VOA control circuit 22 synthesizes the signals it receives from the gain controller 24 and the tilt controller 35 into electronic commands to the variable optical attenuator 20 which instruct the attenuator 20 the degree to which each channel is to be attenuated in order to achieve the gain selected by the set point circuit 32 while eliminating tilt in the amplifier output.

Figure 2:
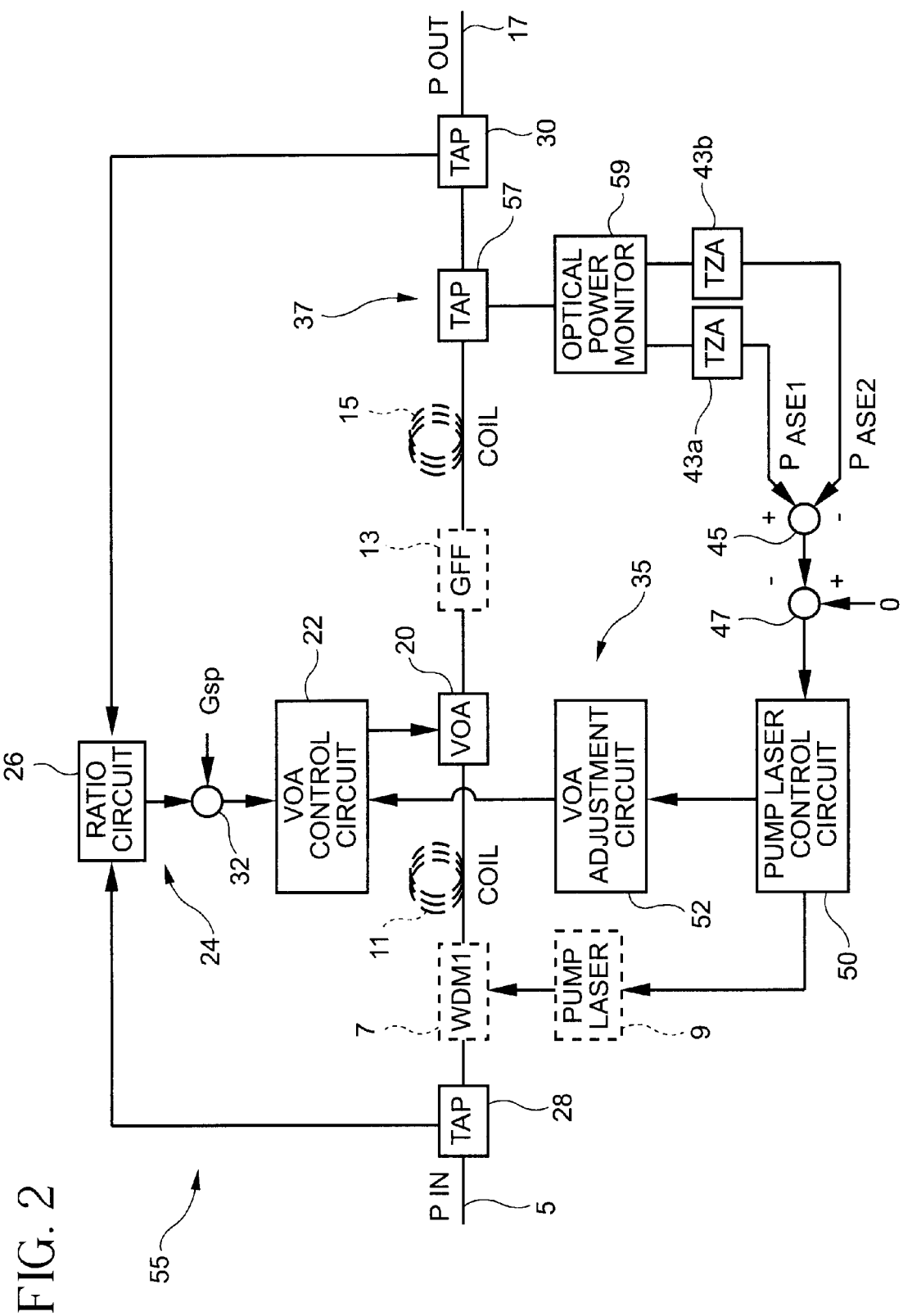
FIG. 2 is a second embodiment of the dynamic controller which utilizes only a single optical tap in combination with an optical power monitor in lieu of a pair of optical taps.

FIG. 2 illustrates a second embodiment 55 of the dynamic controller. In this embodiment, the pair of wave division multiplexers in the noise monitoring circuit 37 of the FIG. 1 embodiment have been replaced by a single optical tap 57, which in turn transmits a small percentage of the entire spectrum of the output of the amplifier 3 to an optical power monitor 59. The optical power monitor 59 contains a plurality of photodiodes and is capable of selecting different points across the output spectrum of the amplifier, and converting the light associated with these points into two different electrical signals which are in turn amplified by trans-impedance amplifiers 43a,b. The resulting signals are processed in the same manner as described with respect to the embodiment of FIG. 1. The advantage of replacing the wavelength division multipliers 39a,b of the first embodiment with the tap 57 and optical power monitor 59 is that the comparison points in the spectrum of the optical output may be varied, if desired. As was the case with the first embodiment, the specific points selected are preferably frequencies existing in between the data-carrying channels of the amplifier output. In the preferred embodiment, the optical power monitor 59 may be a commercially available power monitor manufactured either by Corning Incorporated or by JDS Uniphase.

Figure 3:
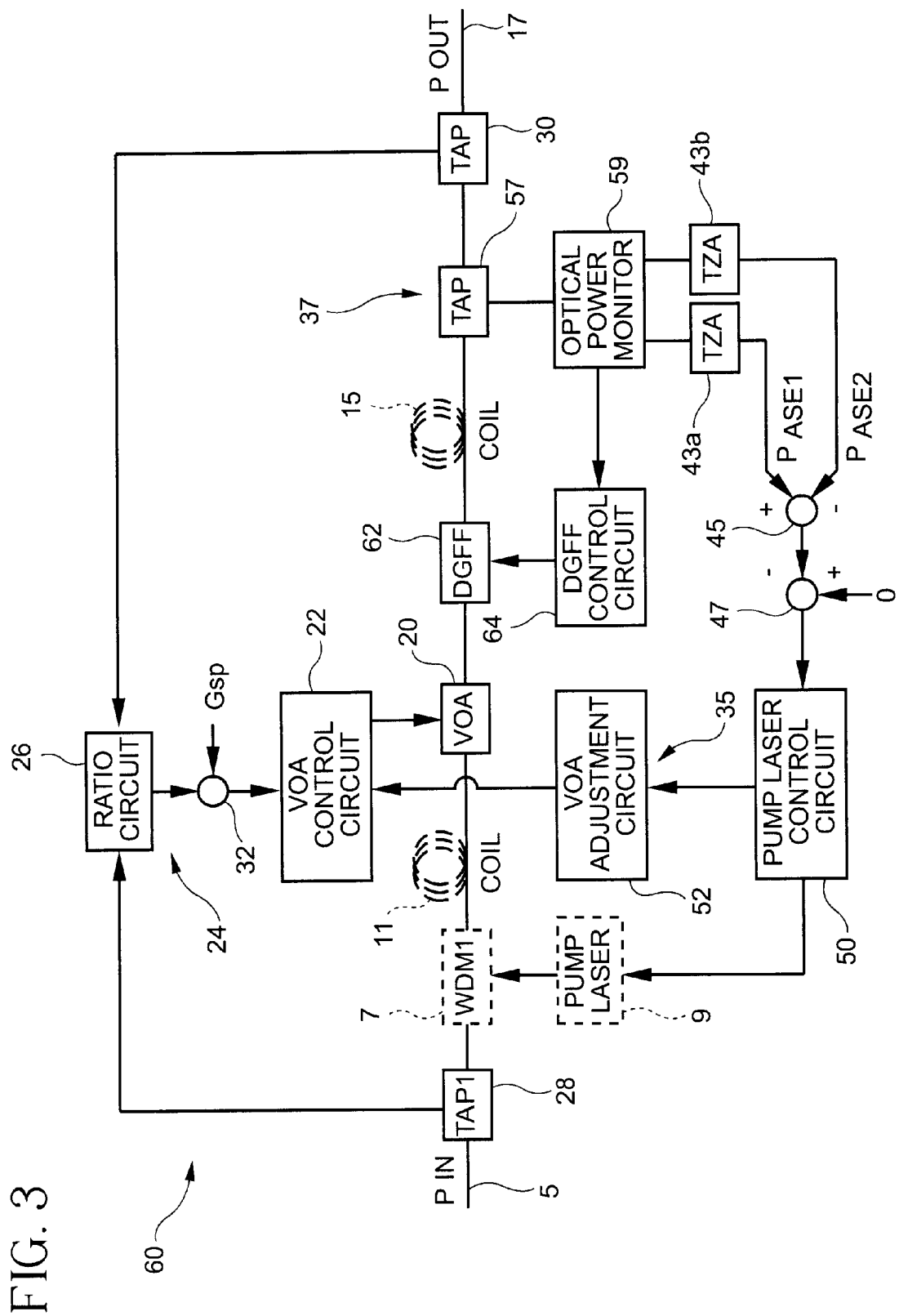
FIG. 3 is a third embodiment of the invention which is similar to the second embodiment with the addition of a dynamic gain flattening filter in combination with a dedicated control circuit therefor.

FIG. 3 represents a third embodiment 60 of the dynamic controller of the invention. This embodiment is identical to the second embodiment illustrated in FIG. 2, with the exception that the static, non-adjustable gain flattening filter 13 normally associated with the optical amplifier 3 has been replaced with a dynamic gain flattening filter (DGFF) 62 which has a capacity to vary the attenuation of the optical channels contained within the amplifier output, thereby complementing the function of the variable optical attenuator 20. To this end, a DGFF control circuit 64 is connected to the dynamic gain flattening filter 62. An input of the DGFF control circuit is connected to an output of the optical power monitor 59, which provides the circuit 64 with a signal indicative of the amount of tilt associated with the amplifier output.

Figure 4:
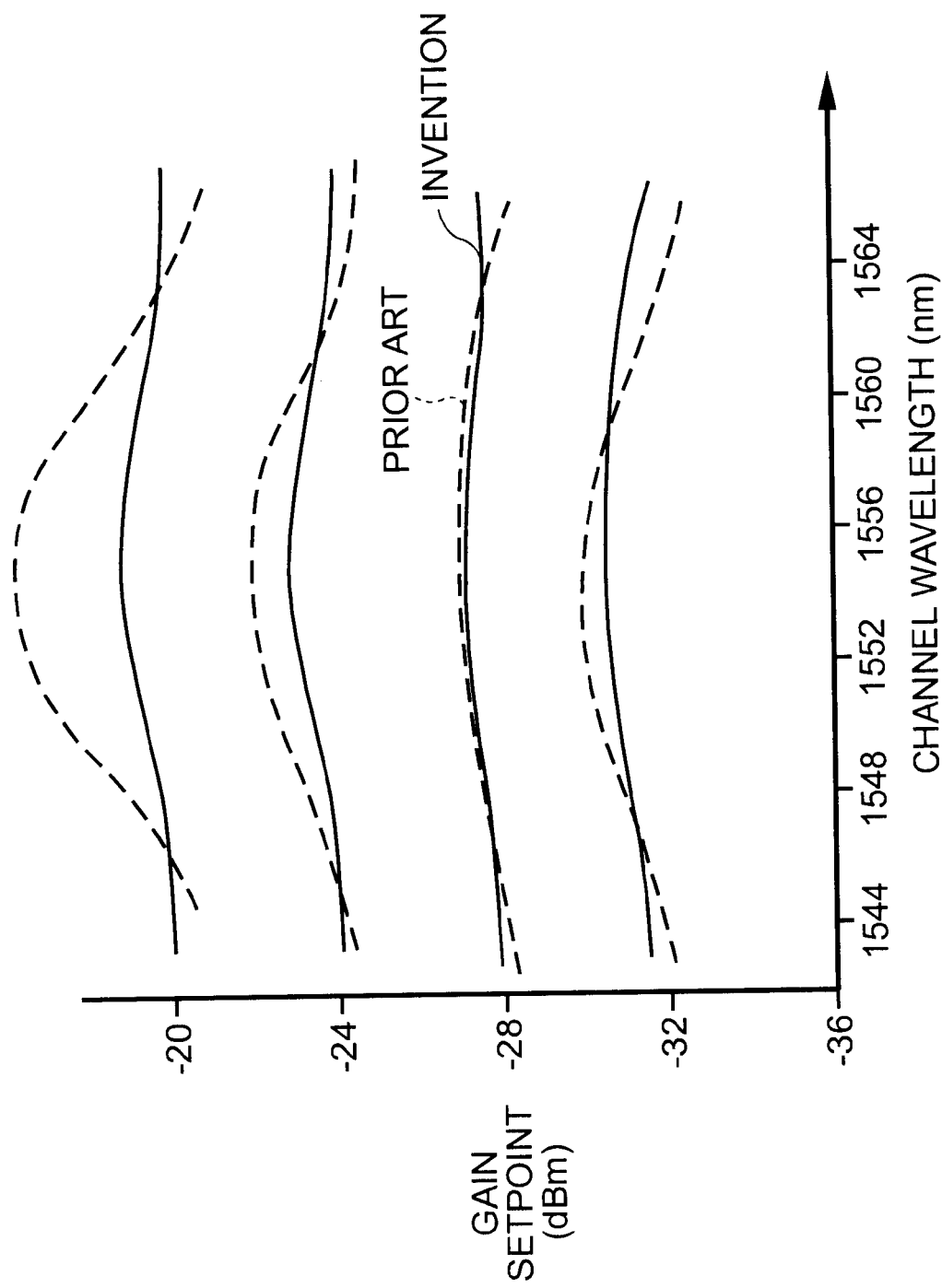
FIG. 4 is a graph indicating optical channel wavelengths (expressed in nanometers) over amplification gain, comparing the amplifier output of the invention (indicated in a solid line) over a multi-channel spectrum for a variety of gain set points versus the output of a prior art optical amplifier (indicated in a dash line) over the same channel spectrum and gain levels.

FIG. 4 is a graph that compares the operation of an optical amplifier equipped with the dynamic controller of the invention (solid line) with a prior art optical amplifier (dotted line). At a gain set point (28 dBm) that the prior art amplifier is calibrated for, both optical amplifiers have a relatively flat, substantially tilt free output. However, at gain levels above and below the specific gain set point that the prior art optical amplifier is calibrated for, increasing amounts of tilt are evident in the amplified output. By contrast, the output of an amplifier equipped with the controller of the invention remains substantially flat over a broad range of selectable gain set points, represented by the distance between 20 and 32 dBm in the graph.

While this invention has been described with respect to several preferred embodiments, various modifications and additions to the invention will become evident to persons of skill in the art. All such variations, modifications, and additions are intended to be encompassed within the scope of this patent, which is limited only by the claims appended hereto.

PARTS LIST

1. Dynamic controller (1$^{st}$ embodiment)
3. EDFA-type optical amplifier
5. Optical input wave guide
7. Wavelength division multiplexer
9. Pump laser
11. Upstream amplification coil
13. Gain flattening filter
15. Downstream amplification coil
17. Output wave guide
19. [Dynamic controller]
20. Variable optical attenuator
22. Attenuator controller
24. Gain controller
26. Ratio circuit
28. Input tap
30. Output tap
32. Set point circuit
35. Tilt controller
37. Noise monitoring circuit
39. Wavelength division multiplexers a, b
41. Photodiodes a, b
43. Trans-impedance amplifiers a, b
45. Comparator circuit
47. Tilt set point circuit
50. Pump laser control circuit
52. VOA adjustment circuit
55. Dynamic Controller, second embodiment
57. Tap
59. Optical power monitor
60. Dynamic controller, third embodiment
62. Dynamic gain flattening filter (DGFF)
64. DGFF control circuit

What is claimed is:

1. A dynamic controller for a multi-channel optical amplifier, comprising:

a variable optical attenuator coupled between an input and output of the amplifier;

a control circuit connected to the variable optical attenuator for generating control signals instructing the attenuator of an amount that each channel should be attenuated;

a gain controller connected to the control circuit for providing a signal indicative of an average amount of per channel attenuation necessary to achieve a selected gain set point, and a tilt controller connected to the control circuit for providing a signal indicative of relative amounts that different channels should be attenuated to reduce tilt, including a noise monitoring circuit.

2. The dynamic controller according in claim 1, wherein said gain controller includes a ratio circuit connected to input and output signals of said amplifier for providing a signal indicative of actual amplifier gain.

3. The dynamic controller according in claim 2, wherein said gain controller further includes a set point circuit connected to said ratio circuit for providing a difference signal to said-control circuit indicative of a difference between selected amplifier gain and actual gain.

4. The dynamic controller according in claim 1, further comprising an optical gain flattening filter for attenuating optical channels to reduce tilt in the amplifier output.

5. The dynamic controller according in claim 2, wherein said gain controller further includes first and second tap circuit assemblies optically connected to the input and output of the amplifier for providing said input and output signals to said ratio circuit.

6. The dynamic controller according in claim 1, wherein noise monitoring circuit of said tilt controller is optically connected to the amplifier output and provides a signal indicative of relative amplitudes of amplified noise between different channels.

7. The dynamic controller according in claim 6, further comprising a pump laser, wherein said tilt controller further includes a pump laser control circuit for providing a signal indicative of a power level that said laser should be operated at to reduce tilt.

8. The dynamic controller according in claim 7, wherein said tilt controller includes a tuner circuit connected to said power level signal for providing a signal to said control circuit indicative of relative amounts that different channels should be attenuated to reduce tilt.

9. The dynamic controller according in claim 6, wherein said noise circuit includes two photosensitive circuits for converting different frequencies of the optical output of the amplifier into electrical signals, and wherein said different frequencies fall between different channels in the output.

10. The dynamic controller according in claim 9, wherein said noise circuit further includes an error circuit connected to said signals of said photosensitive circuits for providing a signal indicative of relative amplitudes of said signals.

11. A dynamic controller for a multi-channel, erbium-doped fiber amplifier of the type including a pump laser for amplifying an optical input, comprising:
   a variable optical attenuator coupled between an input and output of the amplifier;
   a control circuit connected to the variable optical attenuator for generating control signals instructing the attenuator of an amount that each channel should be attenuated;
   a gain controller connected to the control circuit for providing a signal indicative of an average amount of per channel attenuation necessary to achieve a selected gain set point, and
   a tilt controller connected to the control circuit and the pump laser for providing a signal indicative of relative amounts that different channels should be attenuated to reduce tilt.

12. The dynamic controller according in claim 11, wherein said gain controller includes a ratio circuit connected to input and output signals of said amplifier for providing a signal indicative of actual amplifier gain.

13. The dynamic controller according in claim 12, wherein said gain controller further includes a set point circuit connected to said ratio circuit for providing a difference signal to said control circuit indicative of a difference between selected amplifier gain and actual gain.

14. The dynamic controller according in claim 12, wherein said gain controller further includes first and second tap circuit assemblies optically connected to the input and output of the amplifier for providing said input and output signals to said ratio circuit.

15. The dynamic controller according in claim 11, further comprising an optical gain flattening filter for attenuating optical channels to reduce tilt in the amplifier output.

16. The dynamic controller according in claim 15, wherein said gain flattening filter attenuates preselected channels preselected amounts to reduce tilt.

17. The dynamic controller according in claim 16, wherein said gain flattening filter is responsive to a signal generated by said tilt controller to dynamically attenuate different channels different amounts to reduce tilt.

18. The dynamic controller according in claim 11, wherein said tilt controller includes a noise monitoring circuit optically connected to the amplifier output for providing a signal indicative of relative amplitudes of amplified noise between different channels.

19. The dynamic controller according in claim 18, wherein said tilt controller further includes a pump laser control circuit for providing a signal indicative of a power level that said laser should be operated at to reduce tilt.

20. The dynamic controller according in claim 19, wherein said tilt controller includes an adjustment circuit connected to said power level signal for providing a signal to said control circuit indicative of relative amounts that different channels should be attenuated to reduce tilt.

21. The dynamic controller according in claim 18, wherein said noise circuit includes two photosensitive circuits for converting different frequencies of the optical output of the amplifier into electrical signals, and wherein said different frequencies fall between different channels in the output.

22. The dynamic controller according in claim 21, wherein said noise circuit further includes an error circuit connected to said signals of said photosensitive circuits for providing a signal indicative of relative amplitudes of said signals.

23. The dynamic controller according in claim 18, wherein said noise circuit further includes an optical power monitor for providing a plurality of different optical frequencies to said photosensitive circuits.

24. The dynamic controller according in claim 23, further comprising a dynamic gain flattening filter connected to an output of said optical power monitor.

25. A dynamic controller for a multi-channel optical amplifier, comprising:
   a variable optical attenuator coupled between an input and output of the amplifier;
   a control circuit connected to the variable optical attenuator for generating control signals instructing the attenuator of an amount that each channel should be attenuated;
   a gain controller connected to the control circuit for providing a signal indicative of an average amount of per channel attenuation necessary to achieve a selected gain set point, and
   a tilt controller connected to the control circuit for providing a signal indicative of relative amounts that different channels should be attenuated to reduce tilt, including a noise monitoring circuit,
   wherein said gain controller includes a ratio circuit connected to input and output signals of said amplifier for providing a signal indicative of actual amplifier gain.

26. A dynamic controller for a multi-channel optical amplifier, comprising:
   a variable optical attenuator coupled between an input and output of the amplifier;
   a control circuit connected to the variable optical attenuator for generating control signals instructing the attenuator of an amount that each channel should be attenuated;
   a gain controller connected to the control circuit for providing a signal indicative of an average amount of per channel attenuation necessary to achieve a selected gain set point, and
   a tilt controller connected to the control circuit for providing a signal indicative of relative amounts that different channels should be attenuated to reduce tilt, including a noise monitoring circuit,
   wherein said gain controller further includes a set point circuit connected to said ratio circuit for providing a difference signal to said control circuit indicative of a difference between selected amplifier gain and actual gain.

* * * * *